United States Patent [19]

Drown et al.

[11] Patent Number: 4,944,550

[45] Date of Patent: Jul. 31, 1990

[54] TELESCOPING TYPE COVER FOR TRUCK BEDS AND THE LIKE

[75] Inventors: Donald L. Drown; Richard O. Runge, both of Galion; Elmer L. Brumenshenkel, Lexington, all of Ohio

[73] Assignee: Versa Cap, Inc., Galion, Ohio

[21] Appl. No.: 277,250

[22] Filed: Nov. 29, 1988

[51] Int. Cl.[5] .............................. B60P 3/32; B60P 7/02
[52] U.S. Cl. ....................................... 296/100; 296/26; 296/165; 296/175
[58] Field of Search ................. 296/26, 164, 165, 175, 296/176, 56, 99.1, 106, 100

[56] References Cited

U.S. PATENT DOCUMENTS

| | | | |
|---|---|---|---|
| 3,447,830 | 6/1969 | Willison | 296/100 |
| 4,199,188 | 4/1980 | Albrecht et al. | 296/100 |
| 4,289,346 | 9/1981 | Bourgeois | 296/105 |
| 4,397,497 | 8/1983 | Alonzo, Jr. et al. | 296/165 X |
| 4,620,743 | 11/1986 | Eke | 296/56 X |
| 4,659,136 | 4/1987 | Martin et al. | 296/165 X |
| 4,746,161 | 5/1988 | Futrell | 296/24 R |
| 4,784,429 | 11/1988 | Hodges | 296/165 |

*Primary Examiner*—Dennis H. Pedder
*Attorney, Agent, or Firm*—Baldwin, Egan, Fetzer, Oldham & Oldham

[57] ABSTRACT

An enclosure assembly enabling the selective covering of an area such as the bed of a pickup truck of the like. The assembly includes a plurality of extendable and collapsible cover sections interconnected by an actuating system. The actuating system enables the rear cover section of the assembly to be pivoted to a collapsed or extended position by a pivoting structure having unique cam and leverage characteristics. The entire assembly can be selectively power operated or locked into position using a clutch mechanism associated with the actuation system. The enclosure assembly affords simple and effective operation to provide for the convenient use of the truck bed or similar area.

22 Claims, 11 Drawing Sheets

TELESCOPING TYPE COVER FOR TRUCK BEDS AND THE LIKE

TECHNICAL FIELD

This invention relates in general to a telescoping enclosure assembly covering an area and being selectively collapsible for access to the area. More particularly, the invention relates to a telescoping type enclosure assembly covering the open bed of a truck or the like which is selectively collapsible and extendable over the bed area.

BACKGROUND OF THE INVENTION

There are known in the prior art various enclosure or cap assemblies for use with pickup trucks or the like to cover the bed area thereof. Prior enclosure assemblies have included rigid or cap members having dimensions to entirely enclose the pickup truck bed or similar area. Those caps may be slid on and off the side walls of a pickup truck by means of tracks positioned on the side walls which have elongated channels formed therein. The cap members include a male portion thereon for cooperating and engaging the channels in the track members. Examples of this type of arrangement can be found in U.S. Pat. Nos. 4,693,508 or 3,773,380.

With the above-described enclosure assemblies, problems have been found to result in the fact that the utility and use of the truck beds for hauling or carrying cargo is limited by the enclosure device. As the needs for the truck bed change, it is very inconvenient to repeatedly remove and replace the cover assembly as it is somewhat large and not easily handled.

Other known enclosure assemblies have included sections being removably secured to the side walls of the truck bed in similar track assemblies. Although breaking the enclosure assembly into sections does make its instgallation and removal more convenient, there is still the necessity to repeatedly remove and replace the cover portion as the needs for the use of the truck bed change. An example of an enclosure having a plurality of sections can be found in U.S. Pat. No. 4,199,188. As can be seen in this patent, there arises a problem of properly sealing the sections with one another to keep moisture, dirt or the like out of the bed area. It is also necessary to include means for locking the separate cover sections in adjoining relationship on the rails or means to lock a particular section to the rails themselves.

For ease and convenience in use of the truck bed for various purposes, there are also known a variety of retractable enclosure assemblies. These known retractable enclosures have been constructed of soft foldable materials such as canvas or other fabrics mounted on a number of frame members slidably engaged to track members on the side walls of the truck bed. Alternatively, a plurality of rigid cover sections may be provided in a telescopically collapsible and extendable arrangement wherein the enclosure sections are slidably engaged along the track members. Examples of collapsible enclosure assemblies can be found in U.S. Pat. Nos. 4,289,346 or 4,659,136.

Although these enclosure assemblies allow the selective opening or enclosing of the truck bed without the need for repeatedly removing and installing the enclosure assembly or sections thereof, they have presented problems in jamming or binding of the frame members or sections within the track members mounted on the side walls of the truck bed. Additionally, the means by which the frame members or sections of the enclosure assembly are moved along the track members have resulted in the uneven application of force to each side of the slidable sections. This results in skewing of the frame members or sections, thereby disabling the smooth operation of the enclosure assembly from its extended and collapsed positions. Also, the means used to collapse or extend the sections have not reliably performed this function is a repeated fashion over the life of the enclosure assembly.

It has thus been found that there is a need for a telescopically collapsing enclosure assembly which enables the area of a truck bed or the like to be conveniently and quickly covered or opened for various uses and which is reliable in its operation. The need also arises for the enclosure assembly to be constructed of a rigid material so as to enable the securing and locking of the storage area of the truck bed and in making the assembly both durable and weather resistant. The enclosure assembly should be easily and selectively operated and simple in its structure to allow flexible use of the truck bed for hauling or recreational purposes.

Other disadvantages are found in that the enclosure assemblies have not enabled the simple and quick securing of the bed area. Elaborate gate or hatch means have normally been necessary in order to secure the rear end of the enclosure in conjunction with the tailgate of the truck. It is also important to ensure safety in the operation of the enclosure assembly. The danger of accidental operation which could present a safety hazard which should be avoided.

Additionally, the enclosure assemblies having gate or hatch means usually allow for the selective opening thereof for access to the truck bed. Previous hatches have normally opened outwardly and may be positioned in an open condition by means of pistons or the like. The open hatch may present sharp corners or other safety hazard as it extends outwardly from the truck itself.

SUMMARY OF THE INVENTION

In view of the deficiencies found in the prior art, the present invention has as a general object to provide an enclosure assembly which is selectively collapsible or extendable to provide access to the interior of the area enclosed when desired.

The enclosure assembly enables positioning of the enclosure assembly between collapsed and extended positions by means of power or manual operation.

It is yet another object of the invention to provide an enclosure assembly which may be selectively secured at any position between fully extended or fully collapsed positions.

Yet another object of the present invention is to provide an enclosure assembly having a hatch or closure gate enabling the enclosed area to be secured and which pivots to a collapsed or extended position upon operation of the enclosure assembly.

A still further object of the invention is to provide an actuation means for the enclosure assembly to allow the selective positioning of a plurality of cover sections as well as enabling the simultaneous movement of a plurality of cover sections for smooth operation.

A still further object of the invention is to provide an enclosure assembly which may be selectively secured at any position between fully extended or fully collapsed positions.

The invention, in accordance with the preferred embodiment, comprises an enclosure assembly for an area having upstanding spaced part walls such as the side walls of a truck bed. A track means is positioned and secured to each of the side walls that extends the length thereof to retain the enclosure assembly. A plurality of rigid cover sections extend between the side walls and include interengaging means which correspond to channels formed in the track members for slidable reception therein. The cover sections are telescopically extendable to enclose the bed area and collapsible to leave the area at least partially open. For operation of the enclosure assembly, actuation means are provided which interconnects the plurality of cover sections for relative movement thereof. The actuation means includes a drive means for application of a driving force to at least one cover section as well as a force applying means enabling slidable or pivotal movement of at least one cover section to either collapsed or extended positions.

The force applying means utilized with the invention acts to pivot the rearward most cover section or hatch into a collapsed position. In this aspect of the invention, a force applying means includes a tensioning or bias means coupled to a pivoting structure interconnected with the hatch. The pivoting structure is releasably secured within the track members located on the side walls of the bed area so as to provide a pivoting force upon activation of the drive means. The tensioning or biasing means also provides a bias force to retain the hatch in an extended or collapsed position and to facilitate the cam action utilized in the pivoting of the hatch to its collapsed position.

The pivoting means of the invention comprises a pivot arm pivoting about a dog link at a first end thereof and a hatch link at the second end thereof. The pivot arm is rotatably coupled at a mid-portion thereof to one of the cover sections of the enclosure assembly In turn, the hatch link is pivotably coupled to the hatch section whereby, upon operation of the actuation means, a force will be applied through the dog link to rotate the pivot arm about its mid portion and apply a force to the hatch through the hatch link. The force applied to the hatch acts to pivot the hatch section as well as to pull it along guide members associated with an adjacent one of the cover sections. The pivoting of the hatch into a collapsed position at the upper portion of an adjacent cover section allows the hatch of the enclosure assembly to be completely removed as an obstacle. This eases operation as well as eliminates the safety hazards which may be associated with outwardly opening hatches.

In another aspect of the invention, a preferred track assembly is provided to slidably support at least one cover section of the enclosure assembly. A channel, being substantially J-shaped, is formed in the track members and corresponds to an interengaging means formed on the rigid cover section for slidable reception in the track members. The shape of the channels formed in the track members allows a biasing force to be asserted upon the cover members towards the interior of the enclosure assembly to facilitate proper sliding of the cover sections upon activation of the drive means. The biasing force applied by means of the J-shaped channels helps to prevent skewing of the cover sections upon application of a slightly unequal force to each side thereof during actuation.

In another aspect of the invention, the actuation of the enclosure assembly may be conducted manually by means of a selectively disengagable clutch mechanism in the drive means of the assembly. In this way, the power actuation means is selectively operable to preclude the danger of accidental operation such as by children or the like which could present a safety hazard. The clutch mechanism is key operated so as to insure operation of the assembly is not initiated until desired.

These objects and features of the invention as well as additional objects and advantages thereof will become apparent from the detailed description of the preferred embodiments in reference to the accompanying drawings.

BRIEF DESCRIPTION OF THE DRAWINGS

In the description of the invention, reference will be made to the accompanying drawings wherein like reference numerals will designate like elements in the various figures. For understanding of the scope of the invention and for the complete understanding of the objects, techniques, and structure thereof, reference should be made to the following detailed description of the accompanied drawing wherein.

DETAILED DESCRIPTION OF THE INVENTION

Figure 1:
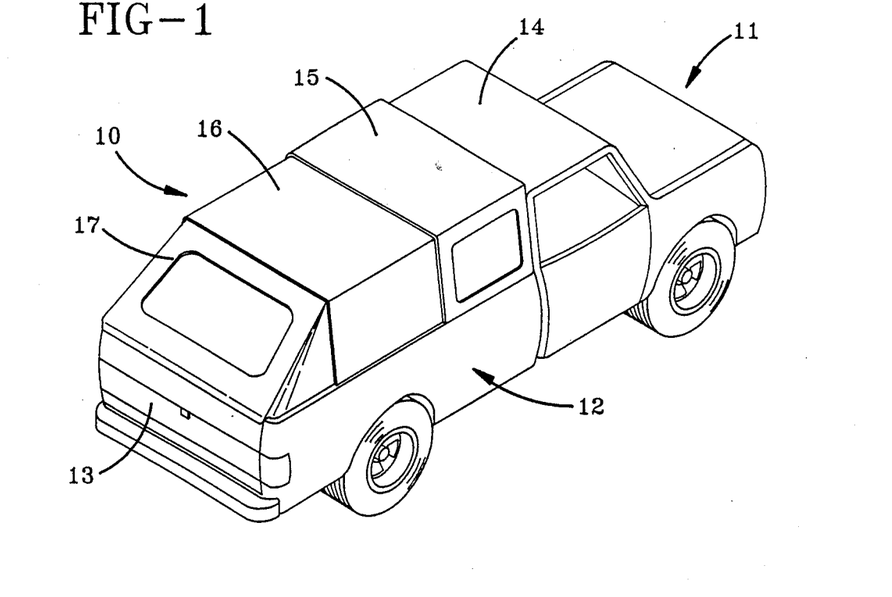
FIG. 1 is a perspective view of a pickup truck having the enclosure assembly of the invention mounted over the bed area thereof and shown in its fully extended position.

Referring now to FIG. 1, there is shown a pickup truck generally designated 11 having the enclosure assembly 10 of the invention mounted thereon. A pickup truck includes a bed 12, which depending on the size and type of vehicle will vary in length and width accordingly. The bed area 12 is enclosed on its rear portion by a tailgate 13 which is pivotably supported at its lower corners so as to fold out and enable convenient loading of the bed area. The pickup truck 11 also includes a cab portion 14 in which the occupants of the vehicle will be seated. The enclosure assembly 10 of the invention comprises a plurality of sections 15, 16, and 17, which when fully extended will completely enclose the bed area 12 of the pickup truck. In the preferred embodiment, the forwardmost or front section 15 of the enclosure assembly is positioned directly adjacent to cab portion 14 and may include access means associated with a window at the rear of the cab portion. In the preferred embodiment, the front section 15 of the enclosure assembly is rigidly secured on the bed 12 of the pickup truck by means of a track assembly. An intermediate section 16 is positioned immediately adjacent to front portion 15 in a sealed relationship when the enclosure assembly is in its fully extended position. A rearwardmost or hatch section 17 is positioned immediately adjacent to intermediate section 16 and extends to the tailgate 13 of the pickup truck so as to fully enclose the bed 12 thereof when the enclosure assembly is fully extended.

It can be seen in FIG. 1, that the plurality of sections associated with the enclosure assembly 10 are dimensioned so as to extend over the full length of the bed area and enclose the same. It is also noted that the hatch portion 17 is formed in a triangular type shape and extends from the intermediate section 16 over the tailgate 13 of the vehicle. In this manner, the hatch portion 17 acts to secure the bed area 12 when the enclosure assembly is in its fully extended position.

Figure 2:
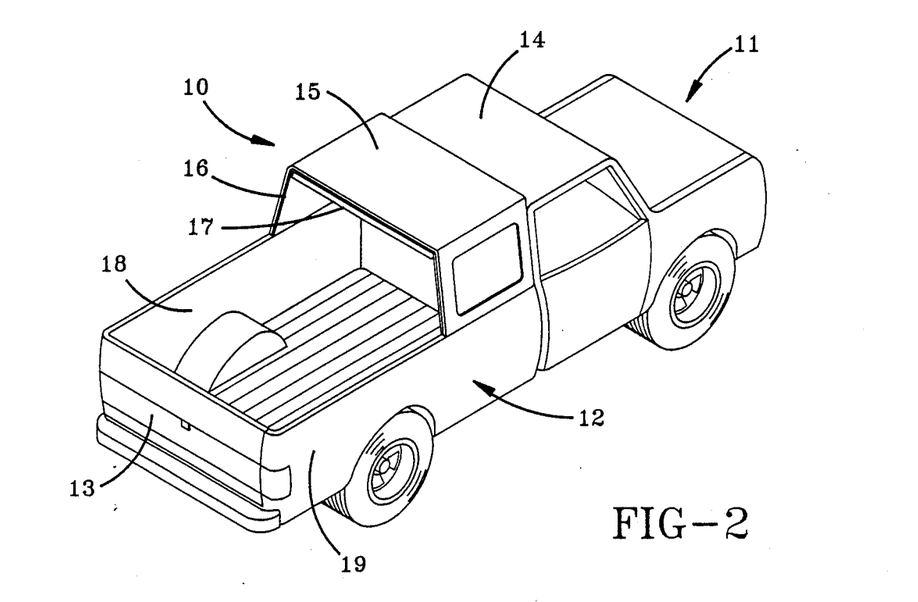
FIG. 2 is a perspective view of the pickup as shown in FIG. 1, showing the enclosure assembly of the invention in its fully collapsed position.

Referring now to FIG. 2, the enclosure assembly 10 is shown in its fully collapsed or retracted position. In this position, the intermediate section is telescopically slidable into an adjacent relationship with the front section 15, and hatch section 17 is pivotably collapsible into a position within intermediate section 16. Also as seen in this figure, the bed portion 12 comprises two spaced apart side walls 18 and 19 on which track means are positioned to support the plurality of cover sections which extend therebetween. The track members may be positioned on insulating material which will seal the bed portion 12 at this location.

Figure 3:
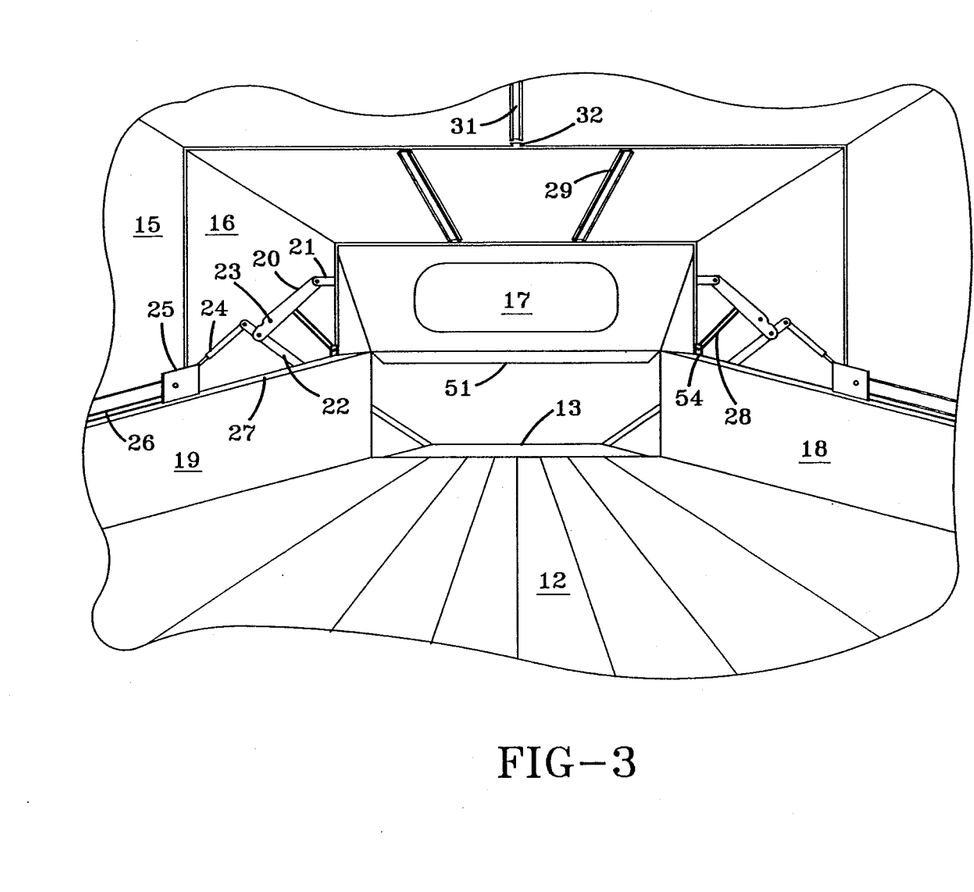
FIG. 3 is a partially cut-away perspective view from inside the bed of the pickup truck as shown in FIG. 1, and showing the enclosure assembly in its fully extended position.

Turning now to FIG. 3, the structure of the enclosure assembly will be described in more detail. A special feature of the invention is the power actuation system associated with the enclosure assembly enabling the assembly to be selectively collapsed or extended as the desired use for the bed portion 12 of the pickup truck changes. The actuation means includes a drive means and force a supplying means interconnecting the forwardmost section 15 with the rearwardmost or hatch portion 17. As mentioned previously, the hatch portion 17 is pivotably movable into an adjacent relationship in section 16 at the upper portion thereof. The pivoting means enabling this function comprises a pivot arm 20 being rotatably coupled to a hatch link 21 at one end thereof and a dog link 22 at a second end thereof. The pivot arm 20 is rotatably mounted to the cover section 16 at a mid-portion 23 thereof by any suitable means such as a support block or the like. A dog link 22 is releasably secured adjacent the side walls 18 and 19 of the bed 12 which will become clear as the description proceeds. The dog link 22 is coupled to a tensioning means 24 at the other end thereof. The tensioning means 24 comprises a pressurized cylinder having a piston arm extending therefrom which is biased to an extended position. The piston arm of cylinder 24 is secured to the intermediate section 16 so as to apply a tension force to the dog link 22 of the pivoting means.

The actuation means also comprises a drive means, a portion of which is shown in FIG. 3. A support plate 25 is mounted on track members 27 supported on the side walls 18 of the truck bed 12. The track members 27 support the plurality of cover sections comprising the enclosure assembly, and have formed therein channels for slidably receiving at least one of the cover sections. The support plate 25 carries a sprocket (not shown) engaging a drive chain 26 which forms part of the drive means to be fully described hereinafter. This entire assembly may be covered with safety covers (not shown) to protect against accident and to make the appearance acceptable.

Figure 4:
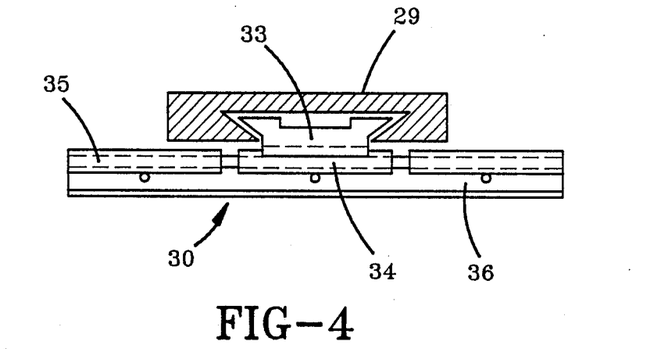
FIG. 4 is a partial sectional view of the guide and hinge members associated with the hatch section of the enclosure assembly.
Figure 4A:
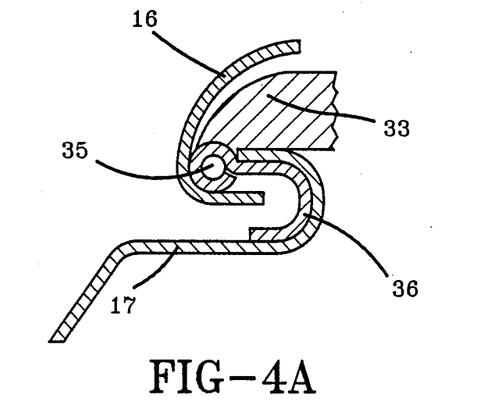
FIG. 4a is a end view of the guide and hinge members shown in FIG. 4 in association with the cover sections.
Figure 5:
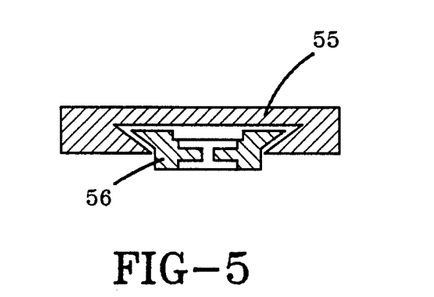
FIG. 5 is a sectional view of the guide assembly associated with the enclosure assembly.

It is also seen in FIG. 3, that guide means 28 are provided on the intermediate section 16 which correspond to hatch brackets 54 positioned on the lower edges of hatch 17. As may be seen in reference to FIG. 5, the guide means 28 and 31 in the preferred form comprise a dovetail bracket 55 corresponding to a dovetail insert 56 which are rotatably secured to the hatch brackets 54 or to bracket 32. Similarly, guide means 29 are provided on the upper portion of intermediate section 16 to facilitate the pivoting action of the hatch into its collapsed position. As seen in FIG. 4, the guide means 29 may also comprise a dovetail bracket corresponding to a dovetail insert 33. This structure also includes a hinge portion 34 corresponding with a hinge 36 secured to the hatch 17. A dowel pin 35 may be utilized to rotatably couple hinge portions 34 and 36. As seen in FIG. 4a, the hinge must be specially designed so as to accommodate the hatch section 17. By this structure, the enclosure assembly may be sealed while allowing proper pivoting of the hatch section 17 to its collapsed position.

Figure 6:
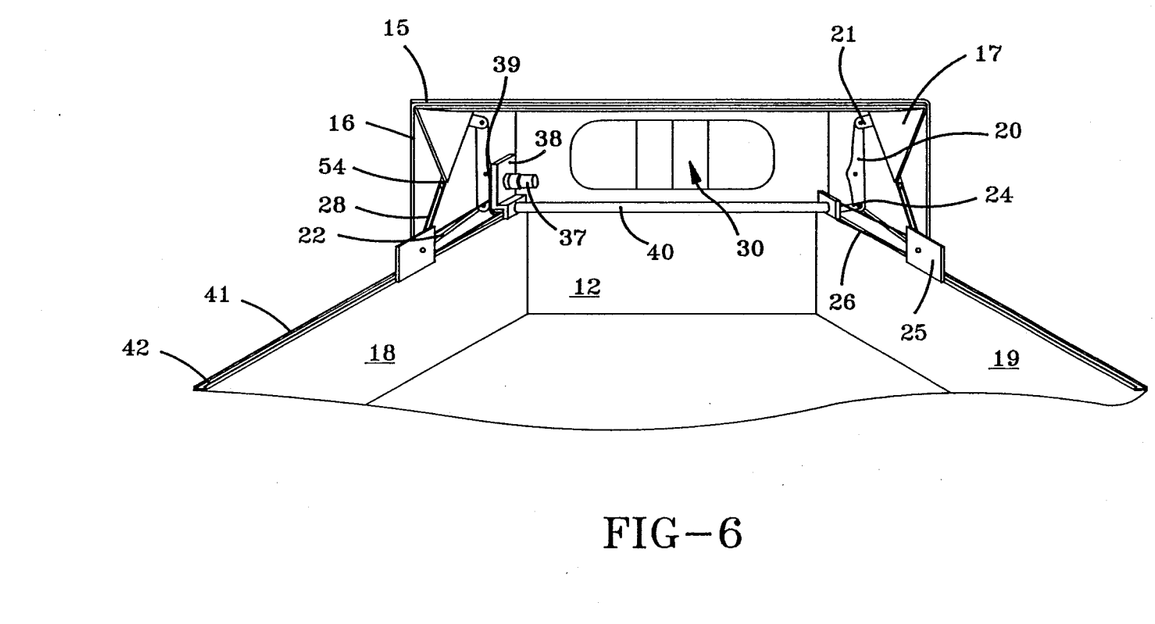
FIG. 6 is a cut-away perspective view of the enclosure assembly looking from the rear of the pickup truck as shown in FIG. 1, and showing the enclosure in its fully collapsed position.

Turning now to FIG. 6, there is shown the enclosure assembly of the invention in its fully collapsed position looking from the rear of the vehicle. The power actuation means associated with the enclosure assembly comprises a motor 37 mounted on bracket 38 and driving a chain 39 coupled to a rotatable shaft 40. A driven shaft 40 is supported by bearing means so as to freely rotate upon activation of the actuation means. The driven shaft 40 extends the width of the bed 12 of the vehicle and has at each end thereof a sprocket coupled to a length of roller chain 26 which is coupled to intermediate cover section 16. Upon activation of the drive means, the shaft 40 will rotate chains 26, thereby applying an equal force to both sides of section 16 to slidably move intermediate section 16 into its collapsed position. The drive means will also initiate the pivoting means acting to move hatch section 17 into its collapsed position.

Figure 7:
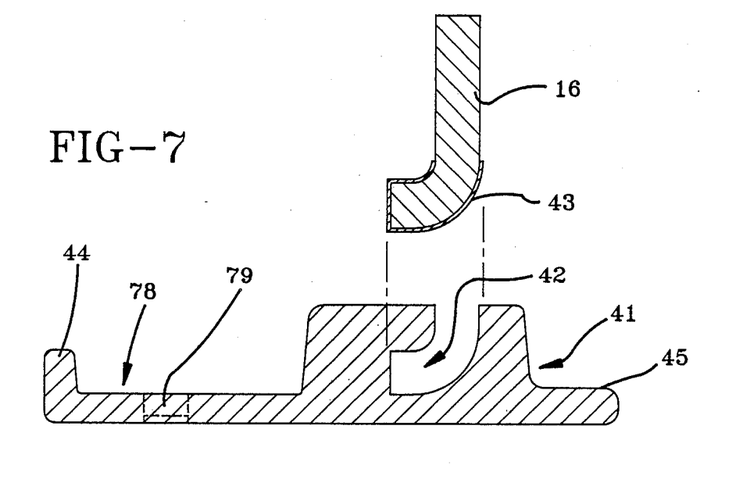
FIG. 7 shows an end view of a track member positioned on the side walls of a truck bed, and a corresponding wall of a section of the enclosure assembly.
Figure 7A:
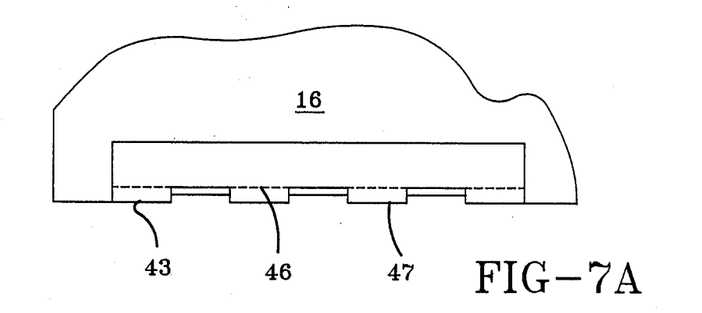
FIG. 7a is a partial side view of a section of the enclosure assembly corresponding to the track member as shown in FIG. 7.

Also seen in FIG. 6, a window 30 may be provided having movable sections therein which correspond to a rear window in the cab portion of the pickup truck. Access to the interior of the enclosure assembly may be provided through window 30 from the cab portion. Alternately, the front section 15 could be sealed to the cab of the pickup truck eliminating the need for window 30 and providing direct access to the enclosure. The track members 41 are also shown to comprise channels 42 formed therein being substantially J-shaped for slidably receiving a corresponding portion on intermediate cover section 16. As seen with reference to FIGS. 7 and 7a, the track member 41 having channel 42 formed therein corresponds to a similarly shaped end portion on cover section 16. It has been found that some materials which may be utilized in the construction of the track members 41 or cover section 16 may be incompatible and create undesirable friction and wear within the channel 42. For this reason, a supplemental portion 43 of a compatible material may be provided on the cover section 16 to facilitate proper sliding movement within channel 42 as well as extend the life of these components. As seen in FIG. 7a, the supplemental portion 43 may be provided with projections 47 corresponding to notches 46 formed in cover section 16. In this way, the member 43 may be securely engaged With cover section 16 at front and rear portions thereof for the advantages mentioned. It is also noted in FIG. 7, that track member 41 further comprises an outside portion 45 which may be utilized to carry and support the rigidly secured cover section 15 thereon. An inside portion 44 is provided to carry and support the drive means mentioned hereinbefore. The track means also has a drainage gutter 78 formed therein to retain any accumulated water and direct it outside of the bed area.

Figure 7B:
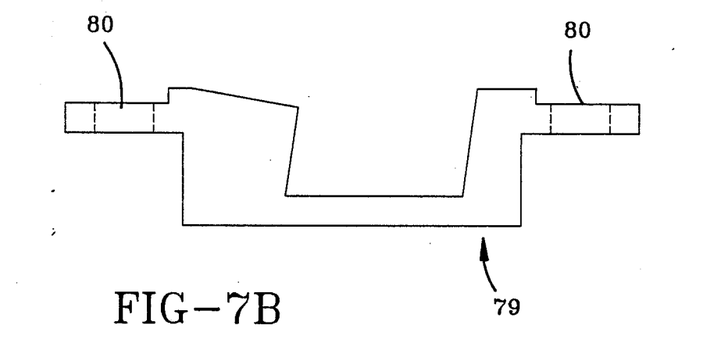
FIG. 7b is a side view of the track insert associated with the pivoting means of the invention.
Figure 8:
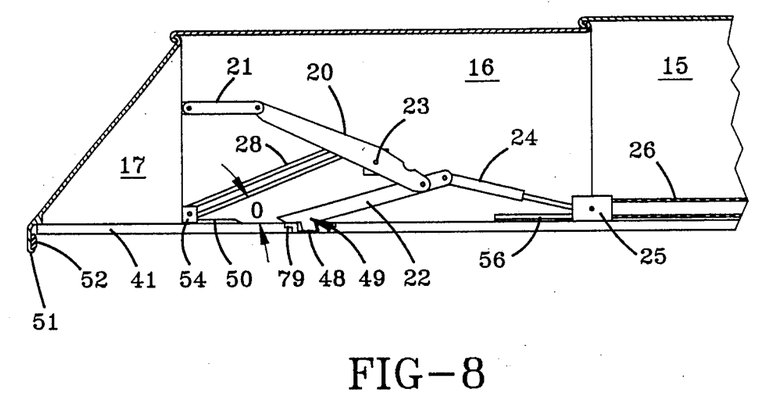
FIGS. 8-11 show the operation of the force applying means and pivoting means during actuation of the enclosure assembly.

As seen in FIG. 7b, there may also be provided a track insert 79 to promote the proper functioning of pivoting means. The track insert 79 has to be positioned with some accuracy for proper functioning of the pivoting means and thus includes holes 80 allowing for longitudinal adjustment of its position. The more particular structure of the track insert 79 and notch 48 will be referred to as the description proceeds.

Turning now to FIGS. 8-11, the operation of the enclosure assembly will be described more fully. The enclosure assembly is shown in its fully extended position in FIG. 8 before activation of the actuation means. The plurality of cover sections 15, 16, and !7 fully enclose the bed area of the pickup truck and sealingly engage one another at the adjacent edges thereof. In this initial position, the pivot arm 20 is rotatably mounted about point 23 on the intermediate cover section 16 of the assembly. The pivot arm 20 is rotatably coupled to hatch link 21, which is in turn rotatably coupled to hatch section 17. The pivot arm 20 is also coupled to dog link 22 having a projection 49 formed thereon. The projection 49 is releasably secured within a notch 48 formed in an insert 79 to within track member 41 on which cover section 16 is slidably engaged. Alternatively, the notch 48 could be directly machined in track 41. The dog link 22 is also coupled to pressurized cylinder 24 having a piston rod extending therefrom and secured at the forward end of cover section 16.

Figure 9:
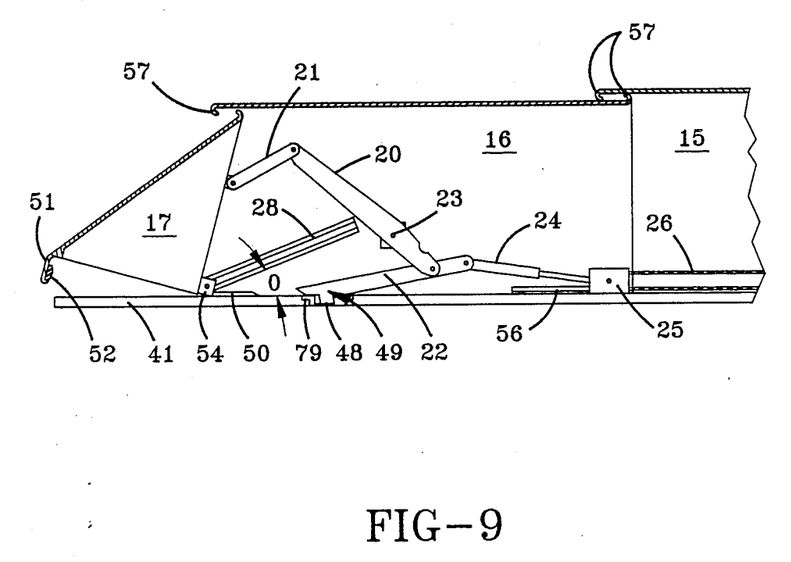

The pressurized cylinder, by means of the piston rod, exerts a tensioning force on dog link 22 so as to keep it firmly engaged in notch 48 at this initial stage. Additionally, the tensioning force applied by pressurized cylinder 24 ensures proper rotation of the pivot arm 20 upon activation of the drive means. The guide means 28 mounted on cover section 16 are pivotably engaged by hatch brackets 54 coupled to hatch 17 at a position adjacent cover section 16. The guide means 28 are positioned at an angle 0 which is preferably approximately 33 degrees from the horizontal track member 41. Also on cover section 16 is provided a ramp 50 positioned at the rearwardmost portion of section 16 adjacent to the track member 41. A support and mounting bracket 56 is also positioned at the forwardmost portion of cover section 16 adjacent to the track member 41 on which the pressurized cylinder and chain retaining means may be secured. In FIG. 9, activation of the drive means has been initiated, and a driving force is applied by means of chain 26 so as to begin slidable movement of cover section 16. It should be recognized that upon movement of cover section 16, the pivot arm 20 will begin rotation about point 23 due to the fact that projection 49 on dog link 22 is secured within notch 48. As can be seen, upon movement of cover section 16, the piston arm of pressurized cylinder 24 will be extended and a downward force applied to the end of pivot arm 20 coupled with dog link 22. Upon force being applied to pivot arm 20, it will begin rotation about point 23 so as to apply a pivoting force to hatch section 17 by means of hatch link 21. The hatch link 21 may be rotatably coupled to hatch section 17 by a bracket or other suitable means. As seen in FIG. 9, the force applied to hatch section 17 will begin pivoting movement thereof about hatch bracket 54. It is also seen that the force applied by hatch link 21 is similarly directed to the orientation of the guide means 28 associated with hatch bracket 54.

Upon further operation of the drive means, the hatch section 16 will continue to be moved to its collapsed position by means of drive chain 26. Similarly, projection 49 on dog link 22 continues to reside in notch 48 and thereby continues to enable rotation of pivot arm 20 about point 23. A pulling and pivoting force continues to be exerted on hatch section 17 by means of hatch link 21 so as to induce hatch section 17 to travel along guide means 28 towards its collapsed position at the upper portion of cover section 16.

Figure 10:
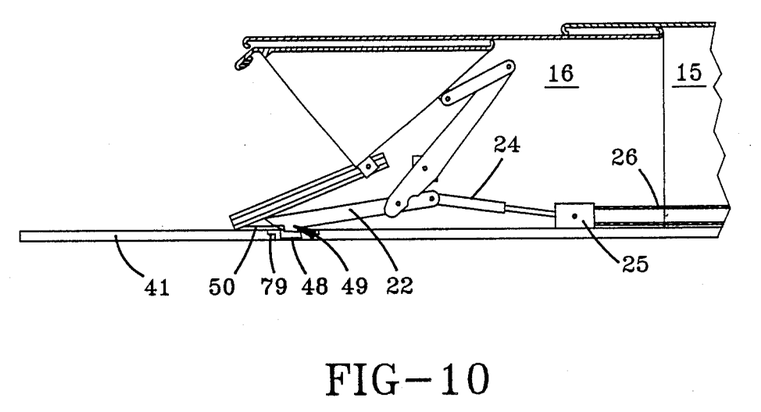

As can be seen FIG. 10, after the hatch section 17 is fully collapsed, the cover section 16 will continue its longitudinal movement towards a collapsed position, and the ramp member 50 will engage dog link 22. The dog link 22 is specially formed to provide a notch between its end and track member 41 such that ramp 50 will lift and disengage projection 49 from notch 48. Upon release of the dog link 22 from notch 48, it is noted that the pressurized cylinder 24 will continue to exert a force on dog link 22 and pivot arm 20 so as to retain the hatch section 17 in its collapsed position. It should be recognized that if not for the force applied by cylinder 24 to dog link 22, the hatch section 17 may have a tendency to pivot about the hatch bracket 54 back to its extended position after dog the link disengages.

Figure 11:
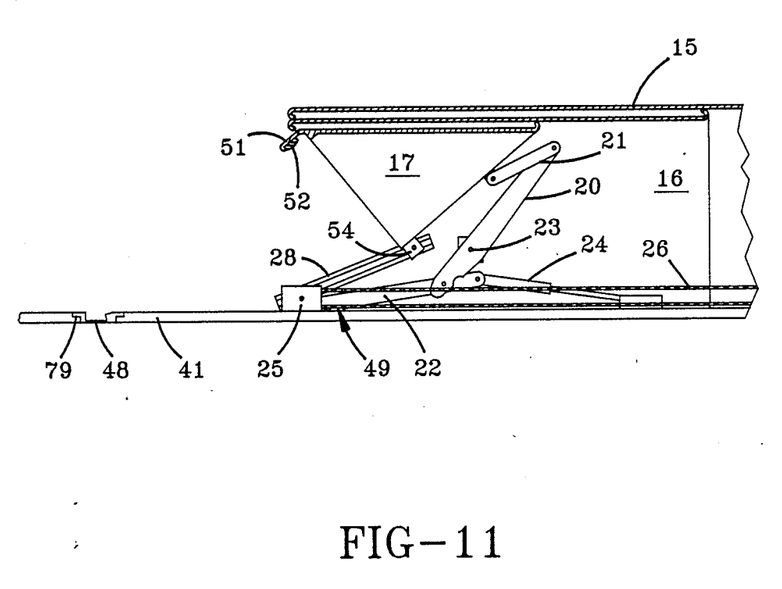

By the construction of the pivoting means of the invention, the pivot arm 20 will rotate to position the hatch section 17 in its final collapsed position adjacent the upper portion of cover section 16. After the hatch section 17 assumes its fully collapsed position, the cover section 16 continues its longitudinal movement until it assumes its fully collapsed position within cover section 15. As seen in FIG. 11, the plurality of cover sections are shown in the fully collapsed position similar to that of FIG. 2. A tensioning force continues to be applied to the pivot arm 20 by means of pressurized cylinder 24 so as to retain the hatch section 17 in its collapsed position as is desired.

Figure 13A:
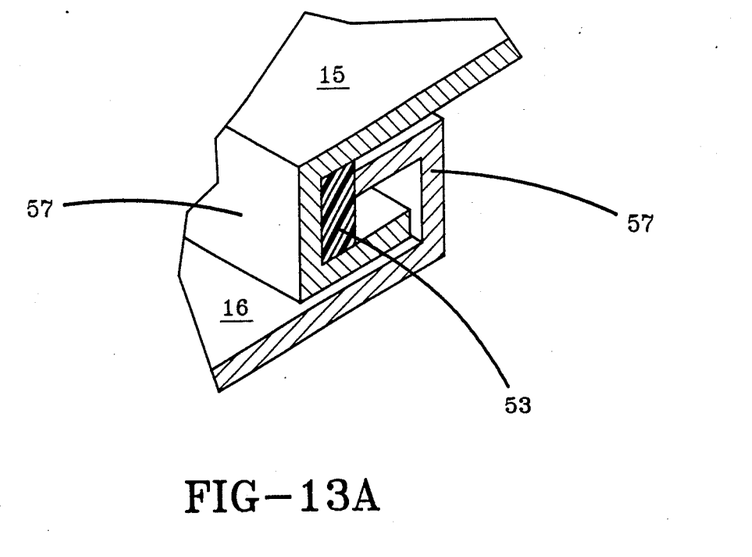
FIGS. 13a and 13b show partial sectional views of a sealing means associated with sections of the enclosure assembly and operable in its fully extended position.
Figure 13B:
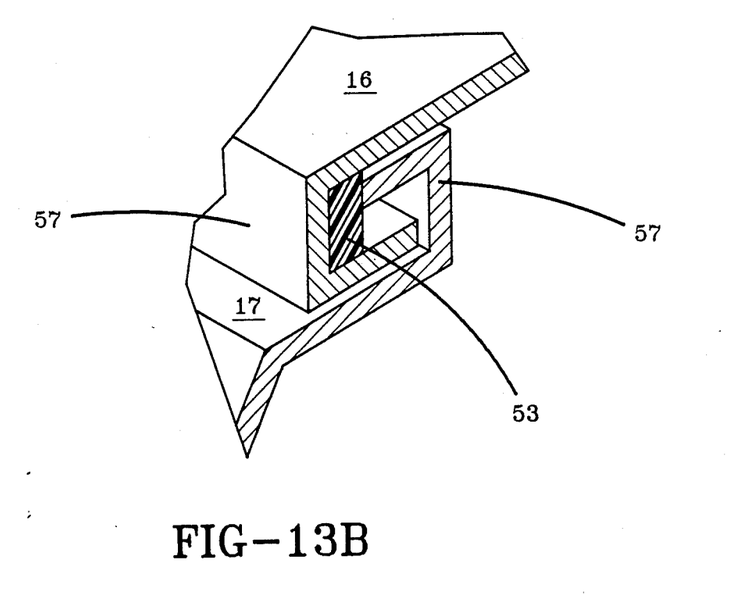

Also as seen in FIGS. 8-11, there is provided on hatch section 17 an extended portion 51 being curved so as to wrap over and around the tailgate of a standard pick up truck. The extension 51 will prohibit the tailgate from being opened when the enclosure assembly is in its fully extended position. In this way, the bed area of the truck may be secured quickly and easily by merely extending the enclosure assembly. The extended portion 51 could also include locking means associated with the tailgate to further secure the enclosure. It is also to be recognized that a tool box may be positioned at the front portion of the bed area having dimensions such that the hatch section 17 may be manually drawn into its extended position to secure a smaller area of the bed. The manual operation of the enclosure assembly will be further described hereinafter. The extension 51 on hatch section 17 may also include a strip of resilient material 52 positioned on the inner side thereof so as to protect the tailgate or similar upstanding wall against damage due to the overlapping relationship of member 51. The resilient member 52 also prevents the ingress of moisture or the like into section 17 is closed. Similarly, sealing members 53 may be provided in conjunction with flanges 57 formed on the end portions of the plurality of cover sections. As seen in FIGS. 13A and 13B, the sealing members 53 located at the end portions of the cover sections adjacent one another will sealingly engage to prevent the ingress of moisture or the like when the cover sections are in their extended positions.

Figure 12:
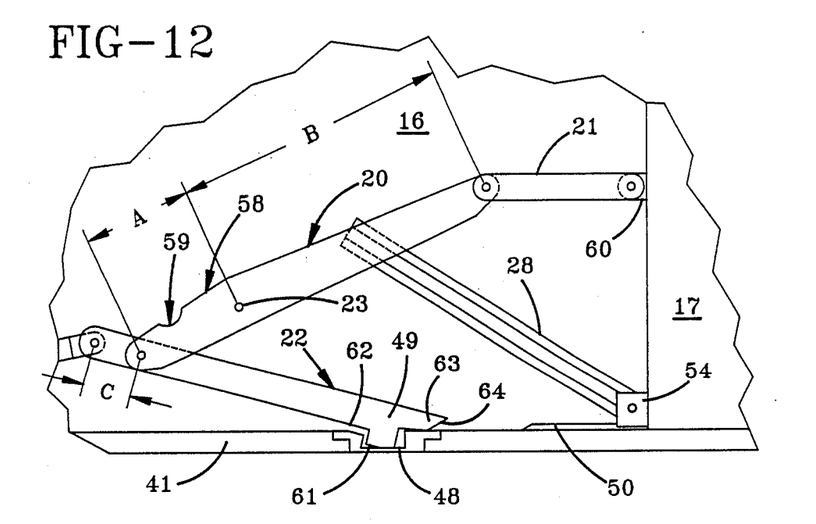
FIG. 12 a partial side view showing more detail of the pivoting means of the invention.

Turning now to FIG. 12 there is shown the pivoting means of the invention in more detail. For use with a conventional full size pick truck, the preferred pivoting mechanism for hatch section 17 comprises pivot arm 20 which is constructed to have a greater width mid-portion 58 which is rotatably coupled to cover section 16 at position 23. The pivot arm 20 also includes a recessed portion 59 which accommodates the coupling point of dog link 22 with the pressurized cylinder 24 when in a fully collapsed position. Point 23 is positioned a distance A from the coupling of pivot arm 20 dog link 22 which in one embodiment is approximately 5¼ inches. The coupling of pivot arm 20 to hatch link 21 is a distance B from point 23 which may be approximately 13¼ inches in length. In this manner, the leverage applied by pivot arm during operation is optimized so as to exert the proper force to urge hatch section 17 into its collapsed position. In the preferred embodiment, the hatch link 21 is approximately 7 inches in length and is coupled to hatch section 17 at approximately 11⅝ inches from the base of the enclosure assembly.

An important aspect of the pivoting means is dog link 22, which is specially designed to exert the initial force upon pivot arm 20 as described earlier. The projection or dog 49 cooperating with notch 48, formed in track insert 79 within track member 41, enables the pivot means to function as described. The projection 49 has a lower surface 61 corresponding to a ramp portion 62 formed in conjunction with notch 48 in the track insert 79 as seen in FIG. 7b. The ramp portion 62 enables projection 49 to be released from the notch upon lifting engagement with ramp 50 as previously described. The notch 48 also includes cooperating surface 81 which is preferably formed parallel to the orientation of the projection 49 within the notch 48. The particular construction enables the projection 49 to be retained in the notch 48 until engagement by ramp 50 will easily release the projection 49.

The dog link 22 includes point 63 forming a notch 64 corresponding to ramp 50 to lift the dog link 22 upon engagement therewith. In the preferred form, the dog link is approximately 16 inches in length and is coupled to pivot arm 20 at a distance C which is approximately 2⅛ inches from coupling with the tensioning means or pressurized cylinder as previously described. It is to be understood that the preferred arrangement of the pivoting means provides the proper leverage and cam action to pivot the hatch section 17 into its collapsed position in an efficient and optimized manner, but the arrangement can be modified as would be apparent to one skilled in the art while remaining within the scope of the invention.

Figure 14:
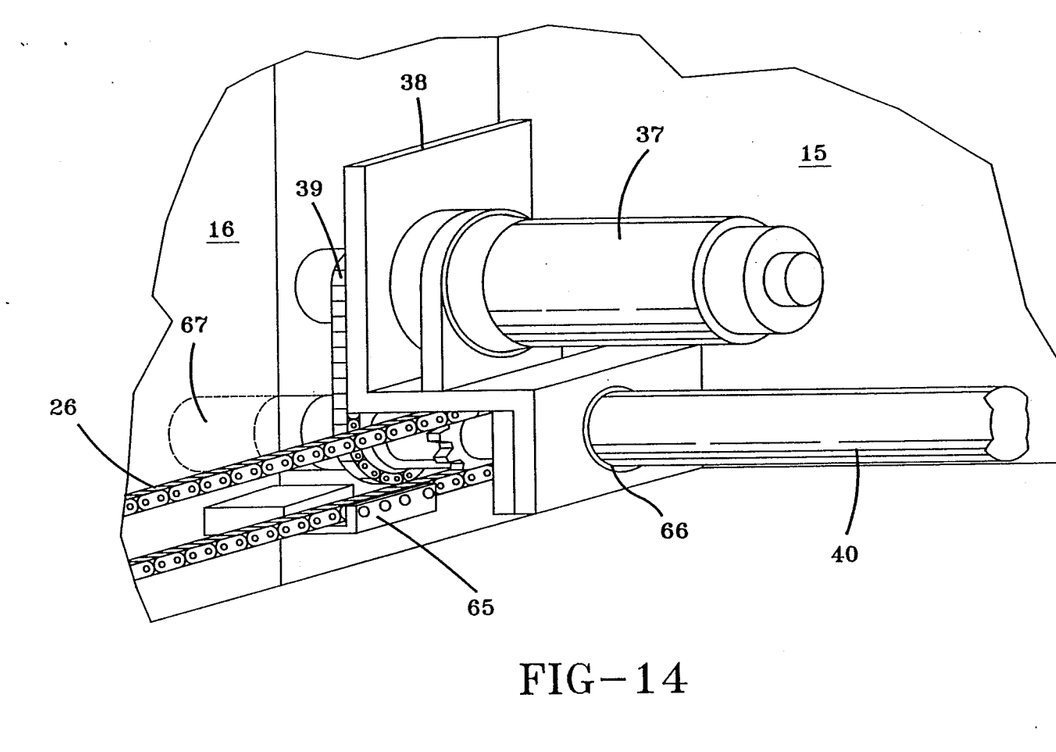
FIG. 14 is a cut-away perspective view of the drive means associated with the enclosure assembly.

Turning now to FIG. 14, the drive means of the invention is shown in more detail. As previously described, the power actuation means associated with the enclosure assembly comprises motor 37, supported by bracket 38 so as to drive a chain 39 when energized. A chain 39 is in turn coupled to shaft 40 to drive chain means 26 coupled to at least one of the cover sections at both sides thereof. The chain 26 is coupled to the cover section by means of a chain retaining bracket 65 which may be welded or otherwise secured to the cover section. The bracket 65 enables the secure retention of the chain while allowing some adjustability in the length thereof. Shaft 40 is rotatably supported by bearing means 46 located in the support brackets at either end thereof. It is apparent that the drive means will exert an equal force to each side of the cover section upon activation thereof. This will ensure smooth movement of the enclosure assembly between extended and collapsed positions.

Figure 15:
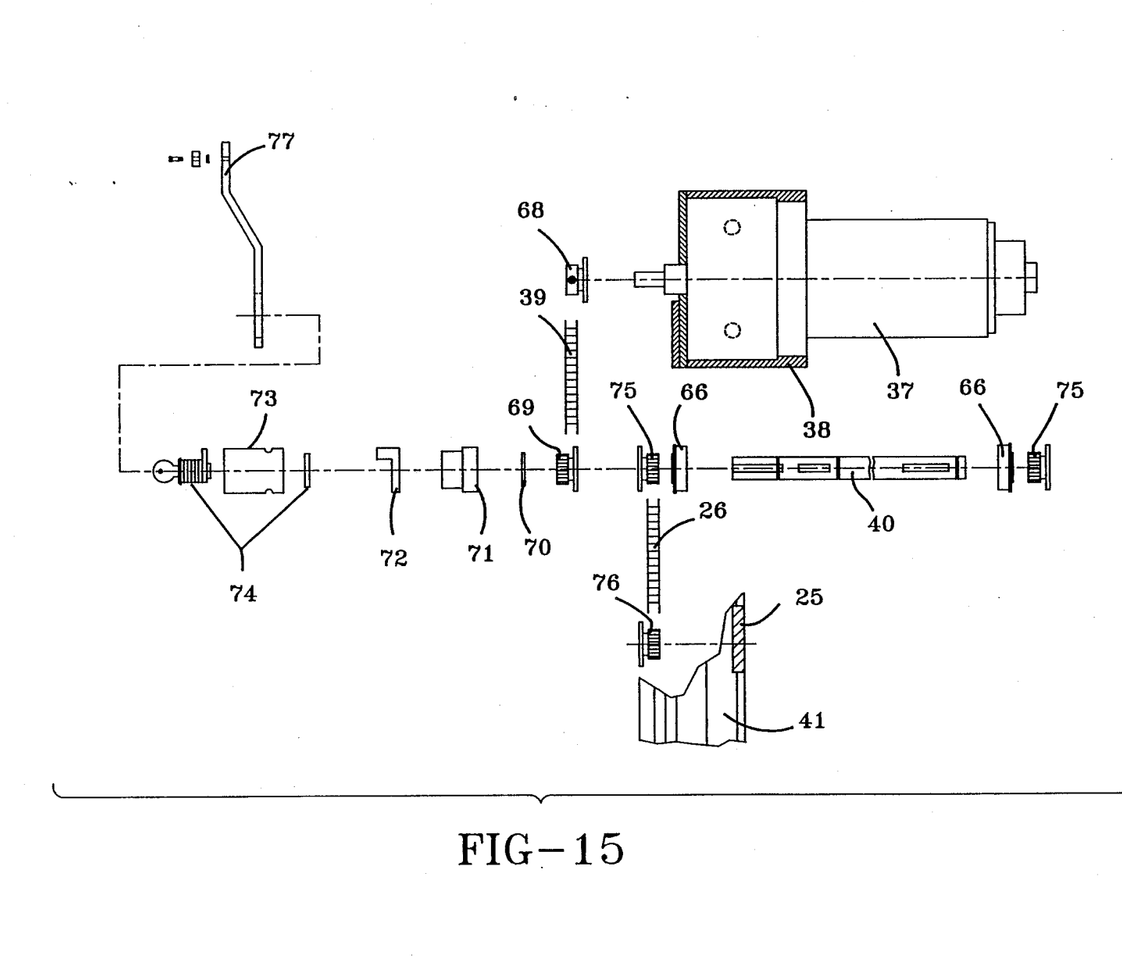
FIG. 15 is an exploded view showing the drive means of the invention in more detail.

It is a special feature of the invention to provide a special clutch mechanism 67 associated with shaft 40 and driven chain 39 so as to selectively enable operation of the drive means when desired. With reference to FIG. 15, the drive means and special clutch of the invention can be seen more distinctly. The full construction of the drive means includes reversible motor 37 supported on mounting bracket 38 having a driven sprocket 68 mounted thereon. The sprocket is coupled with chain section 39 which in turn is coupled to the sprocket 69 forming part of the special clutch 67. The clutch includes a retaining ring 70 and clutch shuttle 71 having formed therein a female portion corresponding to sprocket 69. A strike plate 72 is associated with lock housing 73 and lock and key mechanism 74 such that clutch shuttle 71 may be selectively engaged with the driven sprocket 69. The clutch shuttle 71 is in turn lockingly engaged with shaft 40 such that when the shuttle is engaged with sprocket 69 the shaft will be driven to enable operation of the enclosure assembly. Upon disengagement of the clutch shuttle 71, the shaft 40 will not be driven upon operation of motor 37 which will enable the selective operation of the enclosure assembly. Also seen in FIG. 15 the shaft 40 includes sprocket 75 to drive chain 26 coupled with cover section 16 by means of chain retaining bracket 65. The chain 26 is further supported by sprocket 76 mounted on support bracket 25 mounted on the track members 41. In an alternate embodiment, a crank arm 77 may be provided for manual operation of the drive means.

It should be apparent from the description of the drive means that upon selective engagement of the special clutch 67, the drive means will operate to collapse or extend the enclosure assembly as previously described. The special clutch 67 enables the drive means to be disengaged by key operation such that inadvertent or accidental operation thereof can be avoided. It is also a feature of the clutch mechanism 67, that when in its disengaged position the cover assembly can be manually operated by applying a force to the cover sections. In this way, the hatch section 17, for example, may be extended at any position between fully extended or collapsed positions and locked into place by engagement of the clutch 67. The clutch 67 thus enables the entire enclosure assembly to be selectively locked into any desired position between fully extended or fully collapsed positions. In this way, securing of the bed area can be accomplished quickly and simply as is desired.

Figure 16:
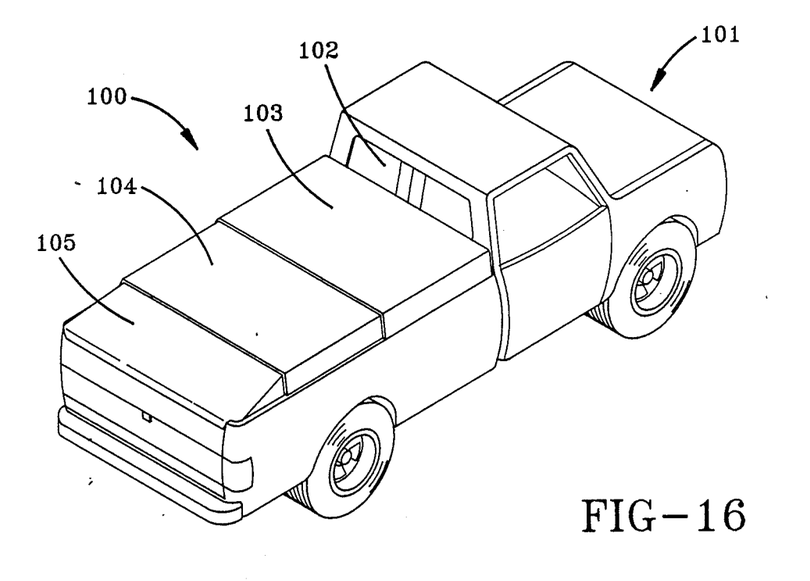
FIG. 16 is a perspective view of a pickup truck showing an alternate embodiment of the enclosure assembly covering the bed area thereof.

An alternate embodiment of the enclosure assembly is seen in FIG. 16 wherein the assembly is designed with different dimensions such that the vision of the vehicle driver is not impeded. The enclosure assembly 100 comprises front section 103 secured to the side walls of the truck 101 similarly to that previously described. A cover section 104 which is slidably received in track members mounted on the side walls of the bed area of truck 101. A hatch section 105 extends so as to enclose the entire bed area of the vehicle similar to that previously described. The operation of the enclosure assembly is identical to that previously described with the particular construction modified according to the changed dimensions thereof. In this embodiment, it is apparent that the drivers vision through a cab window 102 is not impaired by the enclosure assembly 100.

It can readily be seen that the objects of the invention are obtained with the structure described to provide an enclosure assembly having the advantages mentioned. While the preferred embodiments of the present invention have been disclosed herein, it will be appreciated that modification of these particular embodiments may be resorted to without departing from the scope of the invention as found in the appended claims.

What is claimed is:

1. An enclosure assembly for an area comprising:
    track means having a channel formed therein positioned at spaced apart parallel boundaries of said area and extending the length thereof;
    a plurality of rigid cover sections including at least forwardmost and rearwardmost sections extending between said track means and at least one of said cover sections having interengaging means corresponding to said channels for slidable reception in said track means;
    said cover sections being extendable to substantially enclose said area and collapsible so as to leave said area at least partially open;
    said forwardmost cover section being interconnected to said rearwardmost cover section by actuation means which operates to move at least one of said cover sections to collapsed or extended positions and allows selective positioning of at least one of said cover sections at any variable location between extended and collapsed positions;
    wherein said actuation means includes force applying means coupled to said rearwardmost cover section acting to pivot said rearwardmost cover section into a collapsed position within an adjacent one of said cover sections.

2. An enclosure assembly as in claim 1, wherein:
    said force applying means includes a tensioning means coupled to a pivoting means which interconnects at least one of said cover sections to said rearwardmost cover section at both sides thereof, whereby said rearwardmost cover section is pivoted into a collapsed position upon operation of said actuation means.

3. An enclosure assembly as in claim 1, wherein;
    said actuation means further includes drive means having a selectively operable power driven shaft extending between said track means at the location of said forwardmost cover section and coupled to at least one intermediate cover section adjacent each of said track means by longitudinally extending moving means, whereby rotation of said shaft acts to retract or extend said intermediate cover section by application of an equal force thereto at said coupling locations.

4. An enclosure assembly as in claim 3, wherein;
    said longitudinally extending moving means comprises a drive chain coupled to said intermediate section by means of a chain retaining bracket.

5. An enclosure assembly as in claim 2, wherein;
    said tensioning means comprises a pressurized cylinder having a piston shaft slidably extending therefrom on which is exerted a biasing force;
    said shaft coupled to one of said cover sections and said cylinder coupled to a dog link extending toward said rearwardmost cover section, whereby said tensioning means applies a biasing force to said dog link.

6. An enclosure assembly as in claim 5, wherein;
    said pivoting means comprises a pivot arm rotatably coupled to said dog link at a first end thereof, and to a hatch link at a second end thereof while being rotatably supported to one of said cover sections at a mid-portion thereof;
    said hatch link being rotatably coupled to said rearwardmost cover section, whereby upon operation of said actuation means, a force is applied through said dog link to rotate said pivot arm about said mid-portion and thereby applies a force to said rearwardmost cover section through said hatch link acting to pivot said rearwardmost cover section into said collapsed position.

7. An enclosure assembly as in claim 1, wherein;
    said rearwardmost cover section is pivotably coupled at a lower edge thereof to a guide means associated with one of said cover sections adjacent each of said track means to enable said rearwardmost cover section to be pivoted into a collapsed position upon operation of said actuation means.

8. An enclosure assembly as in claim 7, wherein;
    operation of said actuation means acts to pivot said rearwardmost cover section towards said forwardmost cover section at the lower ends thereof nearest to said forwardmost cover section, and to force said lower ends along said guide means such that said rearwardmost cover section is moved to a collapsed position adjacent an upper portion of an adjacent one of said cover sections which extends between said track means.

9. An enclosure assembly as in claim 5, wherein;
    said dog link is releasably secured to said track means to obtain a leverage force applied to said rearwardmost cover section upon operation of said actuation means.

10. An enclosure assembly as in claim 1, wherein;
    said track means has a substantially J-shaped channel formed therein so as to exert an inward force on said interengaging means corresponding to said channels, thereby facilitating the slidable reception in said track means.

11. An enclosure assembly as in claim 1, wherein;
said actuation means further includes drive means selectively operable to initiate the simultaneous movement of a plurality of said cover sections to collapsed or extended positions;
wherein said drive means includes a reversible motor selectively coupled to a power driven shaft by means of a clutch means whereby said clutch means may be selectively engaged to apply a driving force to said shaft.

12. An enclosure assembly as in claim 11, wherein;
said clutch means is selectively engagable with said shaft by means of a clutch shuttle coupled on said shaft and movable into and out of engagement with a driven sprocket coupled to said motor so as to enable the selective operation of said drive means to collapse or extend said cover sections.

13. An enclosure assembly as in claim 1, wherein;
said actuation means includes selectively engagable locking means whereby said plurality of cover sections may be locked into position at any variable location between the extended and collapsed positions.

14. An enclosure assembly as in claim 13, wherein;
said actuation means further includes drive means associated with a selectively engagable clutch means by which said drive means and said actuation means may be locked into position by engagement of said clutch means.

15. An enclosure assembly as in claim 1, wherein;
said area is the bed portion of a vehicle having upstanding spaced apart longitudinal side walls and a tailgate portion extending between said side walls to enclose said area at a rear end thereof;
said track means are secured to each of said spaced apart walls and said plurality of cover sections extend over said area to selectively enclose the same.

16. An enclosure assembly as in claim 15, wherein;
said vehicle further comprises a cab portion extending in front of and substantially above said bed portion, and wherein said enclosure assembly extends at least to the height of said cab portion.

17. An enclosure assembly as in claim 15, wherein;
said vehicle further comprises a cab portion extending in front of and substantially above said bed portion, and wherein said enclosure assembly extends substantially below the height of said cab portion so as not to impair vision from said cab portion.

18. An enclosure assembly as in claim 2, wherein;
said track means further includes a notch positioned therein for releasable coupling to said pivoting means to enable a force to be applied to said pivoting means.

19. An enclosure assembly as in claim 18, wherein;
said notch is formed in a track insert positioned in a recess within said track means which is adjustable in the longitudinal direction.

20. An enclosure assembly as in claim 18, wherein;
said pivoting means includes a dog link having a projection thereof for releasable engagement in said notch, and wherein one of said cover sections includes a ramp portion being engagable with said dog link to disengage said projection from said notch.

21. An enclosure assembly as in claim 14, wherein;
said rearwardmost cover section includes a extension having a curved shaped so as to wrap over and around an upstanding barrier when said rearwardmost section is in its extended position and thereby prevent movement of or said barrier from its upstanding position.

22. An enclosure assembly for an area comprising:
track means having a channel formed therein and extending longitudinally at parallel boundaries of said area;
a plurality of rigid cover sections having opposed side walls extending upwardly with lower opposed side edges corresponding to and engageable with said track means and including a top wall portion extending between said opposed side walls so as to cover the area between said side walls;
said plurality of cover sections being operable to entirely enclose said area when said cover sections are extended in conjunction with one another, and being collapsible within one another so as to leave said area at least partially open;
said plurality of cover sections including at least a front and rear section being interconnected by actuation means enabling the selective positioning of said cover sections at any variable location between fully extended and fully collapsed positions;
said actuation means interconnecting said plurality of cover sections at both of the side walls thereof and acting to automatically pivot said rear cover section into a collapsed position adjacent said top portion of one of said cover sections immediately adjacent said rear section upon operation of said actuation means.

* * * * *